United States Patent [19]
Dospoy et al.

[11] Patent Number: 5,743,924
[45] Date of Patent: Apr. 28, 1998

[54] PELLETIZED FUEL COMPOSITION AND METHOD OF MANUFACTURE

[75] Inventors: Robert L. Dospoy, Westover; Clifford E. Raleigh, Home; Clark D. Harrison, Murrysville; David J. Akers, Indiana, all of Pa.

[73] Assignee: CQ, Inc., Homer City, Pa.

[21] Appl. No.: 770,345

[22] Filed: Dec. 20, 1996

Related U.S. Application Data

[63] Continuation-in-part of Ser. No. 397,909, Mar. 3, 1995, abandoned.

[51] Int. Cl.$^6$ .................................. C10L 5/00; C10L 5/14
[52] U.S. Cl. ................ 44/553; 44/578; 44/590; 44/594; 44/596
[58] Field of Search ................. 44/593, 570, 589, 44/594, 569, 553, 578, 550, 551

[56] References Cited

U.S. PATENT DOCUMENTS

| | | | |
|---|---|---|---|
| 1,453,988 | 5/1923 | Mueller | 44/589 |
| 2,567,136 | 9/1951 | Vloeberghs | 44/553 |
| 4,052,173 | 10/1977 | Schulz . | |
| 4,152,119 | 5/1979 | Schulz | 44/589 |
| 4,179,269 | 12/1979 | Yates et al. | 44/590 |
| 4,225,457 | 9/1980 | Schulz . | |
| 4,236,897 | 12/1980 | Johnston | 44/589 |
| 4,415,333 | 11/1983 | Kutta et al. | 44/553 |
| 4,494,962 | 1/1985 | Christie et al. | 44/589 |
| 4,496,365 | 1/1985 | Lindemann | 44/589 |
| 4,529,407 | 7/1985 | Johnston | 44/553 |
| 4,596,584 | 6/1986 | Darby | 44/590 |
| 5,125,931 | 6/1992 | Schulz . | |

*Primary Examiner*—Margaret Medley
*Attorney, Agent, or Firm*—Daniel J. Long

[57] ABSTRACT

Disclosed is a pelletized fuel composition comprising coal fines in an amount of from 60% to 80% by weight, paper making sludge in an amount of from 10% to 30% by weight, and a shredded polymeric material in an amount of from 0.5% to 15% by weight. Surprisingly and unexpectedly, a high percentage of correctly sized pellets having a desired degree of hardness and structural integrity result without the necessity of a binder, the use of very high pressures or drying the completed pellets by heating at elevated temperatures. A method of manufacturing the fuel composition involving pelletizing at a pressure of from about 1,000 psig to about 4,000 psig is also disclosed.

13 Claims, 1 Drawing Sheet

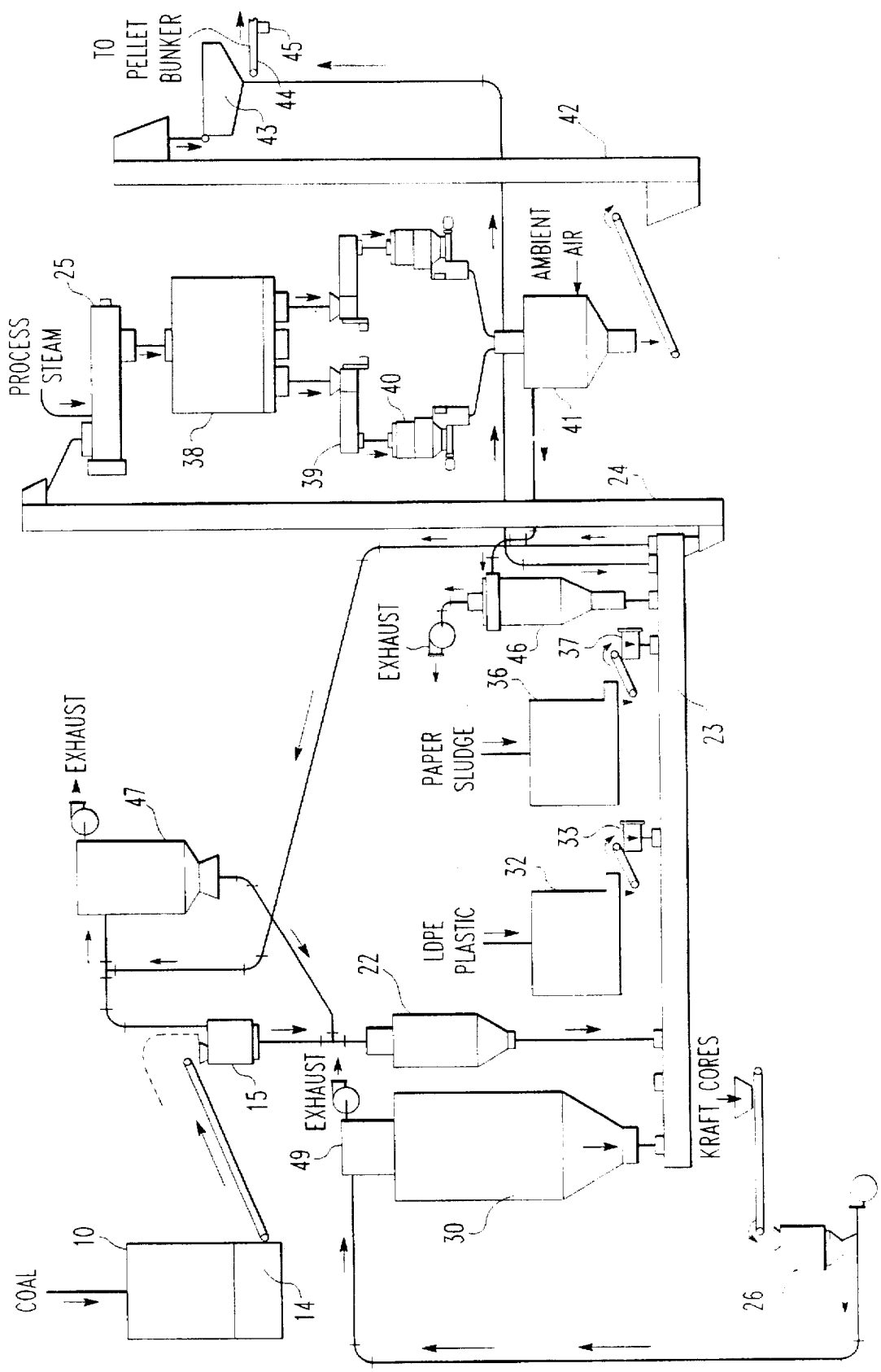

PELLETIZED FUEL COMPOSITION AND METHOD OF MANUFACTURE

CROSS REFERENCE TO RELATED APPLICATION

This is a continuation-in-part of U.S. patent application Ser. No. 08/397,909, filed Mar. 3, 1995 which is abandoned.

BACKGROUND OF THE INVENTION

1. Field of the Invention

The present invention relates to fuels and more particularly to pelletized fuel compositions containing mixtures of coal and other carbonaceous materials.

2. Brief Description of the Prior Art

As the amount of space available for landfilling continues to dwindle, disposal costs will rise, thus increasing public pressure to find alternatives to landfilling. As landfill costs rise, the economics of using wastes as a fuel become more favorable. Not only does the use of waste as a fuel save disposal costs, but often these wastes are closer to potential customers than are sources of coal, thus reducing transportation costs.

Wastes can be successfully burned as a fuel in boilers especially designed to burn the specified waste; however, such specialized boilers are expensive. Wastes can also be blended with coal before combustion and fed to a conventional boiler, but the waste materials often segregate during storage and handling so as to cause slugs of waste to enter the boiler. Normally, the heat content and combustion characteristics of wastes are very different from coal. If wastes enter the boiler in slugs, the operators must deal with a highly variable feed and boiler efficiency may drop. Also wastes are typically more difficult to handle than coal, potentially causing pluggage in chutes and bins.

One solution to providing uniformity in fuel incorporating waste is to pelletize the fuel. In the prior art, however, such pelletizing has generally required the use of an adhesive binder, the use of very high pressures or the drying of the green pellets at elevated temperatures. Heretofore such steps were required to agglomerate coal because coal particles do not naturally stick together unless extremely high pressures (over 20,000 psi for most bituminous coal) are applied and the particle size distribution of the coal is carefully controlled. Even then, problems with entrained air and elastic rebound make such agglomeration a difficult and expensive process. As an alternative to high pressure, an adhesive binder, such as asphalt, is applied to bind the coal particles together. This adhesive itself may add an operating expense of about $5 per ton of agglomerates produced. In addition, equipment to prepare and meter the adhesive adds both capital and operating expense. Because of the high cost of coal agglomeration, the technology is not in widespread use.

A need, therefore, exists for a process of pelletizing coal particles and waste materials which does not require the use of additional adhesives or binders or high forming pressures. A need also exists for a process of pelletizing coal particles and waste materials which does not require the use of additional drying of the completed pellets at an elevated temperature.

SUMMARY OF THE INVENTION

The pelletized fuel composition of the present invention is comprised of crushed coal or other coal fines in the amount of 60% to 80% by weight, paper making sludge in the amount of 10% to 30% by weight, shredded low density polyethylene (LDPE) plastic or other suitable dimensionally reduced polymeric material in the amount of 0.5% to 15% by weight. Shredded paper or other cellulosic material in the amount of 5% to 10% by weight may also be added. The coal is preferably bituminous coal and of a size of 20 mesh or finer. The plastic will preferably be shredded to a maximum dimension of ¼ inch and more preferably ⅛ inch. The invention also includes a method of manufacturing a fuel composition comprising the steps of (a) mixing crushed coal or other coal fines, paper making sludge, shredded plastic and, optionally, shredded paper; and (b) then pelletizing the mixture produced in step (a) at a pressure of from about 1,000 psig to about 4,000 psig. Prior to step (b) the mixture produced in step (a) may optionally be cured by treatment with steam. Such steam treatment may be particularly useful during start up. As those skilled in the art of pelletizing will appreciate, the curing of the mixture will involve approximately equalizing moisture throughout the mixture and achieving a favorable consistency for pelletizing. Surprisingly and unexpectantly, a high percentage of correctly sized pellets having the desired structural integrity may be made without the necessity of an adhesive binder, the use of very high pressures or drying the completed pellets by heating at elevated temperatures.

It will be understood that in the teaching herein that no binder is used means that no additive is used which would be understood in the art to be an adhesive or a binder. The occurrence, of course, of any naturally occurring adhesive or binder in the paper making sludge or in any other component of the composition of this invention is considered to be within the scope of the disclosure of this invention.

It will also be understood that, unless otherwise stated, all proportions of materials disclosed herein will be by weight.

BRIEF DESCRIPTION OF THE DRAWING

The invention is further described with reference to the accompanying drawing which is a schematic illustration of apparatus by means of which a preferred method of manufacturing the fuel composition of the present invention may be carried out.

DETAILED DESCRIPTION OF THE PREFERRED EMBODIMENT

Referring to the FIGURE, incoming coal is initially stored in a coal bunker 10 equipped with a 25–35 ton per hour (tph) vibrating feeder 14. From the storage bunker, coal is transported to an air-swept coal hammer mill which has a capacity of 25–35 tph and wherein there is a 2-inch×0 feed at 2%–8% moisture and 50–85 HGI. The crushed coal is then transported to a 10 ton crushed coal surge bin with weigh feeder 22 for deaeration from where it is fed to a gathering conveyor 23 on which it is transported, along with the other materials to a bucket elevator 24, which carries them to a 25–35 tph continuous mixer 25. Kraft paper cores are reduced in an air-swept paper mill 26, pneumatically conveyed to a 5,000 cubic foot kraft storage bunker 30 which is equipped with a screw feeder to feed the gathering conveyor 23. Plastic is fed to a 1.5 ton storage hopper 32 with screw feeder. Paper making sludge is fed to a 7 ton storage hopper with screw feeder 36. Plastic is removed from the plastic storage through a shredder 33, if required, to the 25–35 tph continuous mixer 25 via the gathering conveyor 23. The paper making sludge is removed from sludge storage, through a sludge delumper 37 to the gathering conveyor 23 for transport to the 25 tph continuous mixer 25. Material which is mixed in the continuous mixer with 2% to 5% saturated process steam added at 10–20 psig during start up and is then removed to a 25–35 tph agitated conditioning tank 38. Conditioned material is removed from the agitated conditioning tank 38 using a pair of metering screws as at 39. The metering screws feed a pair of pellet mill extruders as at 40 that have a die thickness to die hole diameter ratio of 2:1 to 8:1. The pelletized material passes through a 25–35 tph ambient air cooler 41 swept with 2000 cubic foot/min. (SCFM) to 10,000 SCFM ambient air prior to being removed to fuel storage by way of a bucket elevator 42. The pellets leaving the bucket elevator pass through screen 43 and are then moved on product conveyor 44 over belt scale 45 to a pellet bunker. It will also be seen that gases are conveyed to both the screen 43 and the gathering conveyor 23 from the bucket elevator 24. Air is also conveyed from the ambient air cooler 41 to a cooler dust cyclone 46 which exhausts air and returns particulate material to a bag house 47 from where air is exhausted and particulate material recycled immediately upstream from the crushed coal surge bin 22. Air from the air-swept hammermill 26 is received in the bag house 49 from where it is exhausted and particulate material is conveyed to the kraft storage bunker 30.

The composition and method of this invention is further disclosed with reference to the following examples.

COMPARATIVE EXAMPLE 1

Coal, coal refuse, waste paper, digested municipal sewage sludge, lime and binding agents were first mixed in a household blender and then formed into pellets in a die using hydraulic pressure. The pellets were subjected to laboratory analysis. Table 1 below illustrates the effects of varying the individual raw materials on heating value, sulfur retention and ash fusion temperatures. In addition to raw bituminous coal and bituminous coal refuse, other types of coal were also tested. Table 2 shows the results of such tests and demonstrates that the pellets demonstrate different characteristics than the coal component by itself. Table 3 shows trace element analysis for the pellets shown in Table 2.

TABLE 1

Pellet Raw Materials Ratios and Performance

| Sample | % Sludge | % Coal | % Paper | % Lime | Btu | % Sulfur Retained | Soft Temp Reducing |
|---|---|---|---|---|---|---|---|
| 1 | 31.5 | 31.2 | 29.6 | 3.7 | 8424 | 90.0 | 2185 |
| 2 | 41.2 | 31.1 | 20.4 | 3.7 | 8512 | 89.3 | 2205 |
| 3 | 52.4 | 30.4 | 10.2 | 3.0 | 9772 | 69.1 | 2210 |
| 4 | 24.4 | 31.6 | 38.8 | 2.6 | 9857 | 47.9 | 2175 |
| 5 | 31.8 | 49.9 | 10.4 | 3.6 | 10919 | 78.2 | 2210 |
| 6 | 30.1 | 19.2 | 38.4 | 3.2 | 8326 | 55.0 | 2245 |
| 7 | 32.8 | 10.1 | 48.6 | 4.0 | 7875 | 64.0 | 2505 |
| 8 | 34.9 | 31.3 | 29.9 | 0.0 | 9482 | 15.9 | 2365 |
| 9 | 34.0 | 31.2 | 30.3 | 0.0 | 9583 | 5.6 | 2310 |
| 10 | 27.1 | 49.7 | 19.7 | 0.0 | 10817 | 3.2 | 2660 |

TABLE 2

Sample and Pellet Comparisons

| Sample | % Ash | % Sulfur | Btu | SO$_2$/MBtu | Soft Temp Reducing |
|---|---|---|---|---|---|
| Sludge | 36.33 | 1.50 | 6296 | 4.26 | |
| Refuse 1 | 71.78 | 6.53 | 3309 | 39.43 | 2430 |
| Refuse 1 Pellet | 70.15 | 6.01 | 3487 | 34.44 | 2225 |
| Refuse 2 | 65.86 | 2.34 | 4370 | 10.70 | 2570 |
| Refuse 2 Pellet | 63.35 | 2.05 | 4416 | 9.28 | 2320 |
| Western Raw Coal | 9.59 | 1.01 | 12355 | 1.63 | 2240 |
| Western Pellet | 15.33 | 0.88 | 10518 | 1.67 | 2500 |
| Clean Coal | 1.79 | 0.64 | 15080 | 0.85 | 2450 |
| Clean Coal Pellet | 7.62 | 0.57 | 13461 | 0.85 | 2600 |

TABLE 3

Trace Element Analyses

| Element | R1 | Pellet | R2 | Pellet | Western | Pellet | Clean | Pellet |
|---|---|---|---|---|---|---|---|---|
| Arsenic | 1 | 1 | 10 | 10 | 4 | 5 | 2 | 1 |
| Barium | 264 | 246 | 286 | 206 | 46 | 23 | 17 | 48 |
| Cadmium | * | * | * | * | * | * | * | * |
| Chromium | 66 | 57 | 70 | 53 | 4 | 4 | 3 | 3 |
| Fluorine | 184 | 175 | 258 | 176 | 44 | 50 | 56 | 42 |
| Lead | 37 | 38 | 30 | 22 | 5 | 5 | 1 | 6 |
| Mercury | <0.50 | <0.50 | 170 | 153 | <0.50 | <0.50 | 54 | 58 |
| Nickel | 78 | 75 | 74 | 59 | 7 | 8 | 6 | 9 |
| Selenium | 1 | 1 | 2 | 3 | 1 | 3 | 2 | 1 |
| Silver | * | * | * | * | * | * | * | * |
| Zinc | 100 | 105 | 54 | 59 | 10 | 40 | 3 | 22 |

Note: *indicates <0.10

COMPARATIVE EXAMPLES 2–4

In three separate tests (Test 2, 3 and 4) scaled down versions of the procedure described in connection with the FIGURE were essentially carried out in which crushed bituminous coal, kraft paper, paper manufacturing sludge, low density polyethylene (LDPE) plastic and a lignosulfonate binder were mixed in the amounts shown in Table 4 below. Coal properties in the way of moisture, ash, sulfur and BTU value and sludge moisture as received (AR) are shown in Table 5 below. Properties of the resulting pellets in the way of moisture, ash, sulfur and BTU value as received (AR) and moisture after being air dried (ADri) are shown in Table 6 below.

TABLE 4

| | Test 1 | Test 2 | Test 3 |
|---|---|---|---|
| weight coal (lbs) | 2.55 | 2.40 | 0.80 |
| weight kraft (lbs) | 0.10 | 0.20 | 0.10 |
| weight sludge (lbs) | 1.70 | 1.70 | 1.75 |
| weight plastic (lbs) | 0.85 | 0.85 | 0.75 |
| weight polymer (lbs) | 0.20 | 0.00 | 0.00 |

TABLE 5

| | Test 1 | Test 2 | Test 3 |
|---|---|---|---|
| coal moisture (AR) | 4.46 | 4.46 | 4.46 |
| coal ash (AR) | 4.67 | 4.67 | 4.67 |
| coal sulfur (AR) | 0.91 | 0.91 | 0.91 |
| coal BTU (AR) | 14,091 | 14,091 | 14,091 |
| sludge moisture (%, AR) | 64.64 | 64.64 | 64.64 |

TABLE 6

|  | Test 1 | Test 2 | Test 3 |
| --- | --- | --- | --- |
| pellet moisture (%, AR) | 19.81 | 14.48 | 16.44 |
| pellet ash (AR) | 7.89 | 8.63 | 12.18 |
| pellet sulfur (AR) | 0.53 | 0.51 | 0.31 |
| pellet BTU (AR) | 10,259 | 10,741 | 8,984 |
| pellet moisture (ADri) | 17.37 | 11.97 | 13.90 |

COMPARATIVE EXAMPLE 5

A mixture of 75% bituminous coal fines and 25% paper making sludge was produced and was pelletized in a Kahl Mill, Model 45-1250 extrusion pellet mill. This pellet mill had been adjusted to maintain a fixed gap between the roll and die of 1 mm. Because such a fixed gap was maintained, variations in pressure could result due to other variables such as changes in the material being pelletized, but pressure was kept at about 2,000 psig. Extruded pellets were cylindrical in shape and were desirably about ¾ inch in diameter and about 1½ inch to about 4 inch in length. The maintenance of these dimensions was considered to be a measure of both successful agglomeration and pellet hardness and structural integrity. A ¼ inch screen was positioned below the output of the pellet mill, and broken pellets and other material passing through the screen were considered to be unsatisfactory either because of insufficient agglomeration or because of inadequate hardness and structural integrity. For this mixture of 75% coal fines and 25% paper making sludge, 24% of the extruded material passed through the ¼ inch screen.

COMPARATIVE EXAMPLE 6

A mixture of 75% bituminous coal fines, 20% paper making sludge and 5% unshreaded LDPE plastic film was made and pelletized in essentially the same way as was described in Comparative Example 5. The plastic film was generally about 4 inches in length by ½ inch in width and had a thickness of about 1 mm. For this mixture, 30% of the extruded material passed through the ¼ inch screen.

EXAMPLE 7

A mixture of 75% bituminous coal fines, 20% paper making sludge and 5% shreaded LDPE plastic film was made and pelletized in essentially the same way as was described in Comparative Example 5. The plastic film was shreaded so that individual particles of the shreaded film had a major dimension of about ⅛ inch. The film had a thickness of about 1 mm. For this mixture, 10% of the extruded material passed through the ¼ inch screen which was considered to be a satisfactory result.

EXAMPLE 8

A mixture of 75% bituminous coal fines, 20% paper making sludge and 5% shreaded LDPE plastic film was made and pelletized in essentially the same way as was described in Comparative Example 5. The plastic film was shreaded so that individual particles of the threaded film had a major dimension of about ¼ inch. The film had a thickness of about 1 mm. For this mixture, 15% of the extruded material passed through the ¼ inch screen which was considered to be a satisfactory result. While not intending to rely on any particular theory of operation, it is believed that a chemical reaction took place during pelletization. For example, after pelletization the temperature of the pellets appeared to be unexpectantly high. Thus the pellets were formed without the necessity of using an adhesive binder, very high pressures or drying the finished pellets at elevated temperatures.

Elemental, Proximate and Heat of Combustion.

The American Society for Testing and Materials (ASTM) standard elemental analyses gave results for the pellets that are within experimental error from what would be expected for a simple physical mixture of coal fines, sludge and waste plastic for carbon and hydrogen which are the major reactive components of the pellets. Replicated tests showed that (on a dry, ash free basis) the pellets contained 85.62% carbon and 6.00% hydrogen whereas a simple component mixture contained 85.71% carbon and 7.10% hydrogen. Also, the heat of combustion for the pellets (14,814 Btu/lb) was very close to the weighted sums of those measured for the three components (14,630 Btu/lb).

Proximate analysis was performed on the three components and the pellets. Table 7 shows volatile and fixed carbon values for the components and the predicted analysis of a simple mixture of the three. The last row in Table 7 shows the measured values from the pellets. As can be seen, the pellets exhibit higher volatiles and lower fixed carbon than would be obtained from a simple mixture.

TABLE 7

| | Proximate analysis results | |
| --- | --- | --- |
| Sample | Volatiles (wt % daf) | Fixed Carbon (wt % $ daf) |
| Coal | 21.9 | 78.1 |
| Sludge | 95.7 | 4.3 |
| Plastics | 93.2 | 6.8 |
| Mixture | 29.0 | 71.0 |
| Pellet | 34.3 | 65.7 |

TG/MS.

The thermo-gravimetric (TG) data is summarized in Table 8. The experimental sample weight losses were divided into three approximate temperature zones: volatiles desorption at <260° C., low temperature pyrolysis in the range 260° to 400° C. and high temperature pyrolysis at >400° C. Replicated tests showed good repeatability for the samples. The plastic and sludge samples indicated extensive low temperature pyrolysis while the much smaller coal total weight losses occurred primarily above 400° C.

Table 9 lists the proportions of each of the three components used in the pellet mixture along with their calculated contributions to each of the weight loss temperature zones. The fourth row of Table 9 gives the predicted weight loss amounts for homogeneous materials blended in the given proportions. Comparison of the actual mixture and pellet results in Table 8 to the predicted results of Table 9 indicates low temperature weight losses were close to predicted values. Predicted high temperature weight loss agrees closely with the mixture but is lower than that measured for the pellet. This result is supported by the higher volatile content of the pellet noted in the proximate analysis. The heterogeneity of the pellets or potential improper amount of components can not easily explain this difference since the low temperature pyrolysis weight losses are in close agreement. The most likely factor that would be responsible for this difference is that the pellets had undergone a change as a result of the pelletizing process.

The Ms results, accompanying the TG, give some indication of the nature of the volatile products. The plastic TG/MS data exhibit two main peaks. The first peak contains a number of cellulose pyrolysis products such as alcohols, aldehydes, ketones and acids. Many of these are also seen in the sludge spectra. The coal spectra are even more complex than those of the plastic with a vast array of aromatic and aliphatic products.

TABLE 8

Thermogravity (TG) data summary of sample weight and percent weight losses.

| Sample | Sample Weight (mg) | Volatiles | Low Temp Pyrolysis | High Temp Pyrolysis | Total |
|---|---|---|---|---|---|
| Plastic | 2.23 | 5 | 75 | 11 | 90 |
| Sludge | 4.11 | 3 | 62 | 9 | 74 |
| Coal | 14.76 | 1 | 1.5 | 20.5 | 23 |
| Mixture | 19.17 | 1 | 7 | 17 | 25 |
| Pellets | 15.35 | 2 | 6 | 24 | 32 |

TABLE 9

Calculated percent contributions of each component to the expected temperature some weight loss.

| Sample | Mixture Portion | Volatiles | Low Temp Pyrolysis | High Temp Pyrolysis | Total |
|---|---|---|---|---|---|
| Plastic | 2.4 | 0.11 | 1.8 | 0.26 | 2.2 |
| Sludge | 6.8 | 0.20 | 4.2 | 0.61 | 5.0 |
| Coal | 90.7 | 0.91 | 1.5 | 18.1 | 20.5 |
| Total | 100 | 1.2 | 7.5 | 19.0 | 27.7 |

Py-GC/MS.

The Py-GC/MS results show more detail than the MS results from the TG. The plastics sample is dominated by a series of peaks with fairly uniform spacing from the typical alkyldiene, 1-alkene and n-alkane pyrolysis products form polyethylene. Also present at much lower concentrations are ketones and furans from cellulose, styrene and other alkylbenzenes from polystyrene and dihydroxy-benzenes and various phenols from lignin residues. The sludge sample is similarly dominated by the large variety of cellulose pyrolysis products along with much smaller, though significant amounts of styrene and other aromatics from polystyrene and finally traces of lignin products.

Py-GC/MS results of the coal samples indicates alkylbenzenes and alkylnaphthalenes which are typical of the bituminous coal pyrolysis products, along with a variety of aliphatic hydrocarbons. The mixture data readily indicate many of the added peaks from the sludge cellulose. The pellet sample data is largely dominated by the cellulose peaks, particularly anhydroglucose. The very large number of discernible products from each of these analyses suggests a wealth of information which could readily be examined more closely to possibly indicate changes in pyrolysis paths based on changes to polymer matrices. Such detailed data examination would require additional analyses to determine the statistical significance of such variations.

FT/R.

FT/R differs from TG/MS and Py-GC/MS in that it involves the total sample rather than just the portion that devolatilizes. FT/R analysis was made using thin-films and embedding samples in potassium bromide pellets. Multiple FT/R spectrums were obtained for the component mixture and pellets. These spectra indicate that both samples are very heterogeneous, presumably resulting from a variety of different types of plastics used in the blend and the difficulty in obtaining a uniform, well defined mixture. Heterogeneous samples such as these may be better characterized using a photo-acoustic cell rather than potassium bromide pellets. However, the photo-acoustic cell was not available for these tests.

Surprisingly and unexpectantly a high percentage of correctly sized pellets having the desired structural integrity result without the necessity of a binder, the use of very high pressures or drying the completed pellets by heating at elevated temperatures. From Comparative Examples 5 and 6 and Examples 7 and 8 it will be seen that the use of shredded plastic film contributes to achieving the desired degree of agglomeration and pellet hardness and structural integrity. In Comparative Example 5, in which plastic was not used, and in Comparative Example 6, in which unshredded plastic was used, the amount of unsatisfactory extruded material was considerably greater than in Examples 7 and 8 in which shredded plastic material was used.

Although the invention has been described with a certain degree of particularity, it is to be understood that the present disclosure has been made only as an example and that the scope of the invention has been defined by what is hereafter claimed.

What is claimed is:

1. A pelletized fuel composition comprising coal fines in an amount of from about 60% to about 80% by weight, paper making sludge in the amount of from about 10% to about 30% by weight, and a low density shredded polyethylene plastic film having a major dimension of no more than about ¼ inch in an amount of from about 0.5% to about 15% by weight.

2. The fuel composition of claim 1 which also includes paper in the amount of about 5% to about 10% by weight.

3. The fuel composition of claim 2 wherein the paper is shredded.

4. The fuel composition of claim 2 wherein the paper comprises kraft paper cores.

5. The fuel composition of claim 1 wherein the coal is bituminous coal.

6. The fuel composition of claim 1 wherein the coal is of a size of 20 mesh or finer.

7. A method of manufacturing a fuel composition comprising the steps of (a) mixing coal fines in an amount of about 60% to about 80% by weight, paper making sludge in an amount of about 10% to about 30% by weight, and a low density polyethylene (LDPE) plastic having a major dimension of no more than about ¼ inch in an amount of about 0.5% to about 15% by weight; and (b) then pelletizing the mixture produced in step (a) at a pressure of from about 1,000 psig to about 4,000 psig.

8. The method of claim 7 which also includes paper in the amount of about 5% to about 10% by weight.

9. The method of claim 8 wherein the paper is shredded.

10. The method of claim 8 wherein the paper comprises kraft paper cores.

11. The method of claim 7 wherein the coal is bituminous coal.

12. The method of claim 7 wherein the coal is of a size of 20 mesh or finer.

13. The method of claim 7 wherein prior to step (b) and after step (a) the mixture is treated with steam.

\* \* \* \* \*